Figure 1:
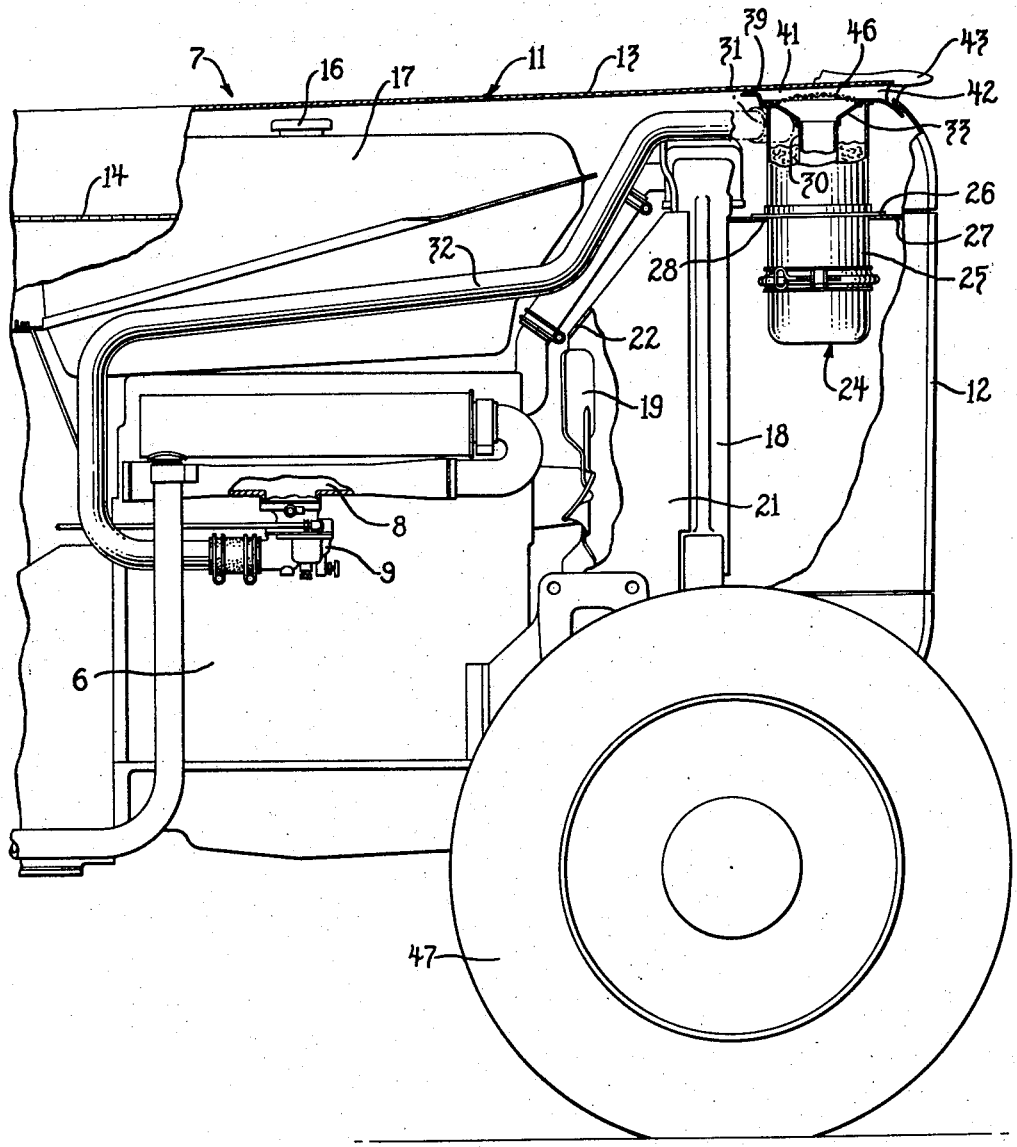

March 3, 1959 H. G. KLEMM 2,875,840
AIR INTAKE SYSTEM FOR MOTOR VEHICLES
Filed Dec. 12, 1955 2 Sheets-Sheet 2

INVENTOR.
HERMAN G. KLEMM
BY James E. Nilles
& Irwin L. Groh
ATTORNEYS.

United States Patent Office 2,875,840
Patented Mar. 3, 1959

2,875,840

AIR INTAKE SYSTEM FOR MOTOR VEHICLES

Herman G. Klemm, Birmingham, Mich., assignor to Massey-Ferguson Inc., a corporation of Maryland Application December 12, 1955, Serial No. 552,380

2 Claims. (Cl. 180—54)

The present invention is concerned with internal combustion engines and more particularly to an air intake system for supplying combustion air to the engine.

The efficient operation of internal combustion engines requires a large supply of clean, cool air for combustion purposes. However, the period of time available to introduce a large volume of air or fuel-air mixture into the cylinder of an internal combustion engine is relatively short. It has been found that air flowing in a long tube remains in motion due to its inertia even after the flow of air is resisted. When a long tube is associated with the intake manifold of an engine a relatively high pressure is created in the manifold adjacent the intake valves so that although the piston slows down near the end of its suction stroke, air will continue to enter the cylinder until its intake valve is completely closed. Thus by using a long tube in the intake system a large volume of air may be introduced into the cylinder of the engine in a relatively short period of time.

Clean air is necessary to prevent damage to the engine parts. Air cleaners or filters are ordinarily used with internal combustion engines but it is still necessary to have a source of relatively clean air to avoid rapid accumulation of dirt in the filter. A dirt laden filter impedes the flow of air in the system and decreases the volume of air which is supplied to the intake manifold.

Cool combustion air is desirable since warm air decreases the volumetric efficiency of the engine, that is a unit of fuel mixed with a given volume of warm air and expanded within the cylinders of an engine will afford less power output than a unit of fuel mixed with the same volume of cool and, consequently, more dense air.

After a supply of air is introduced into an intake system it is important that the various components of the system transmit a minimum of heat to the air. For example, conventional oil bath filters are ordinarily used with internal combustion engines and are located in proximity to the carburetor, which is in a hot area. In considering the length of time for air to pass through a cleaner, it may be considered as a relatively long tube. A cleaner in the carburetor area, therefore, has the same effect as a long tube whose entire length is located in a very hot zone.

One of the most undesirable conditions under which an internal combustion engine may be operated is in connection with an agricultural tractor since the air in the area of operation is ordinarily laden with dust, chaff and insects. In an attempt to solve the problem of obtaining cool, clean air, the air intake for tractor engines has been located at a point at a considerable level above both the ground and the tractor. Unfortunately, this entails the use of pipes which protrude above the tractor body where they not only are subject to damage but also detract from the field of vision of the operator and the appearance of the tractor.

It is a general object of this invention to provide an air intake system for internal combustion engines which affords a large volume of cool, clean air for combustion purposes.

It is a further object of this invention to provide an air intake system for internal combustion engines in which the air intake is located near a source of relatively clean and cool air, and is so located relative to the intake manifold to take advantage of the inertia effect of air moving in a long column.

It is another object of this invention to provide an air intake system in which the various components are so located that a large supply of clean, cool air is obtained and a minimum of heat is transmitted to the air during its movement in the system.

It is another object of this invention to provide an air intake system wherein the various components are so located that they do not detract from the operator's field of vision or the appearance of the tractor.

It is another object of this invention to provide an air intake system in which the air intake and air cleaner are located forwardly of the radiator fan which insulates the various components of the system from the heat of the engine.

It is a further object of this invention to provide an air intake system in which the engine hood forms a part of the intake system.

It is still another object of this invention to provide an air intake system in which the hood forms a part of the system and in which a panel in the hood gives access not only to the various engine parts but also to an air filter screen associated with the air intake system.

The foregoing and other objects and advantages are attained by the present invention, various novel features of which will be apparent from the following description and from the accompanying drawings disclosing a preferred embodiment of the invention.

Figure 2:
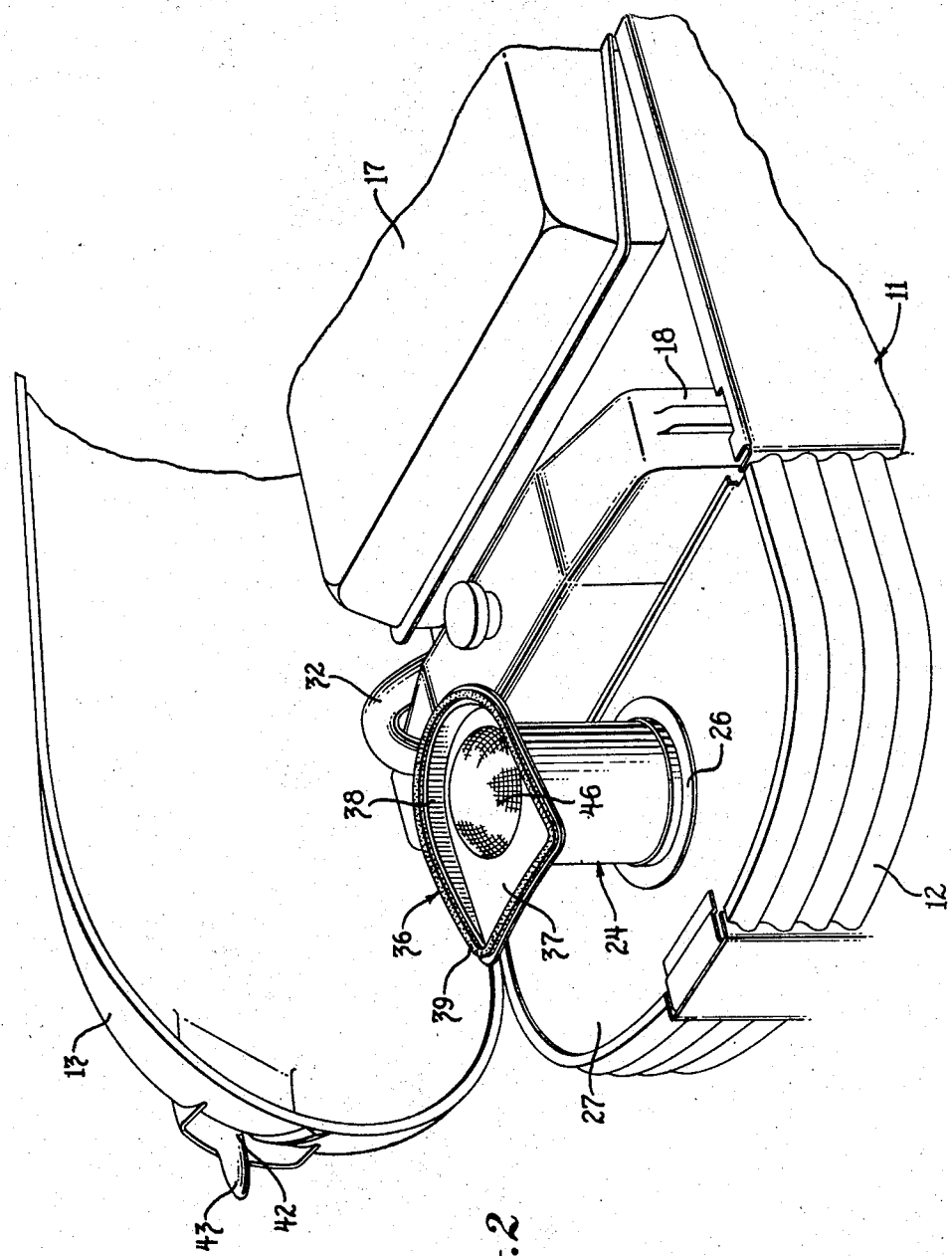

In the drawings:

Fig. 1 is a side view of the forward portion of an agricultural tractor incorporating the air intake system, parts being broken away and shown in sections for the purposes of disclosure; and Fig. 2 is a perspective view of a portion of the tractor taken from the front and to one side of the latter and showing the relation of the various components of the intake system when the panel of the engine hood is in an open position.

Referring to the drawings, the present air intake system is associated with an internal combustion engine 6 of an argricultural tractor 7. The engine is provided with an intake manifold 8 to which a carburetor 9 is connected in the usual manner for receiving air from the combustion air system.

The engine 6 and its components are disposed rearwardly of a grille 12 mounted at the forward end of the tractor 7 and within a hood 11 which extends rearwardly from the grille and across the top and at opposite sides of the radiator and engine. A cover or hood panel 13 is connected by a hinge 14 to one side of the hood 11, and may be swung to an open position as shown in Fig. 2 to afford access to various components under the hood such as the cap 16 on the fuel tank 17, for example.

A cooling radiator 18 is positioned forwardly of the engine 6 and in rearwardly spaced relation to the grille 12. A conventional cooling fan 19 is drivingly connected with the engine 6 and is disposed rearwardly of the radiator. The fan is shrouded by a sheet metal cowl 21 having its forward end connected to the radiator 18. The upper wall 22 of the cowl 21 extends downwardly and rearwardly so that the air intake portion of the cowl disposed adjacent to the radiator 18 is somewhat larger than the air outlet portion of the cowl disposed adjacent the fan. The fan 19 is effective to draw air through both the grille 12 and the radiator 18, so that chaff and large particles of foreign material are separated from the air by the grille before it reaches the radiator.

An air cleaner 24, such as a conventional oil bath cleaner, is disposed between the grille 12 and the radiator 18 in the path of the air drawn by the fan 19. The air cleaner includes a housing 25 of generally cylindrical shape and is provided with a flange 26 extending radially from the housing. A horizontal plate member 27 is rigidly connected at the upper part of the grille 12 and at the upper part of the radiator 18, and is provided with an opening 28 to receive the housing 25 of the air cleaner. The cleaner 24 is disposed in the opening 28 with the flange 26 fastened to the top portion of the plate 27 which acts as a bracket to support the air cleaner in the desired position forwardly of the radiator 18.

As shown in Fig. 1, the air cleaner includes a tube 30 within the air cleaner housing which receives air for the air cleaner and delivers it to an outlet member 31 formed in the upper end of the air cleaner housing 25. The outlet member 31 is connected to the carburetor 9 by a long conduit 32 in the form of a tube, which extends rearwardly, for delivering air to the intake manifold 8.

The centrally disposed tube 30 merges with a funnel-shaped part 33 which affords a relatively large intake opening at the upper end of the air cleaner 24. As best seen in Fig. 2, the upper end of the funnel-shaped part 33 merges with a generally scoop-shaped intake member 36 having a bottom part 37 and a side wall 38. The peripheral edge portions of the scoop-shaped intake member formed by the walls 38 and the forward end of the horizontal bottom portion 37 are shaped to conform to the curvature of the hood cover 13. A resilient gasket 39 is mounted on the peripheral edge portion of the intake member 36 and engages the inner surface of the hood cover when the latter is closed to provide an airtight seal. When the cover 13 is in a closed position, the scoop-shaped intake member 36 and the portion of the hood cover 13 surrounded by the peripheral edge portions form an air intake chamber 41 (Fig. 1) which communicates with the air cleaner.

An air intake opening 42 is formed in a forward end of the hood cover 13 and more particularly in that portion of the hood forming a portion of the air intake chamber 41. The intake opening faces forwardly and, as shown in the drawings, is incorporated with a hood ornament 43.

A screen element 46 is disposed at the juncture of the funnel-shaped part 33 and the scoop-shaped intake member 36, and is so positioned that it completely covers the air inlet to the air cleaner 26. The screen 46 is detachably connected to the air cleaner in any conventional manner to permit easy removal and cleaning.

During operation of the engine, the suction strokes of the piston cause air to be drawn in through the air intake opening 42 into the air intake chamber 41. From the air intake chamber the air passes through the screen 46 into the tube 30 of the air cleaner and then to the air outlet 31 and through the conduit 32 to the intake manifold 8.

In operation of the internal combustion engine, the fan 19 is constantly rotating and air is drawn through the radiator 18 and is directed rearwardly over the engine surfaces. This probably accounts for the fact that the zone forward of the radiator is cooler than the engine zone. For example, as viewed in Fig. 1, it has been found that the temperature near the intake opening 42 is considerably less than the temperature at the same elevation but to the rear of the engine. To obtain equally cool air at the rear of the engine it is necessary to locate the air intake at a stratum high above the hood which, in the past, has been done by extending pipes to the desired elevation to the detriment of the operator's field of vision and appearance of the tractor.

From this it can be seen that the various components of the subject system have been so arranged that relatively cool combustion air is obtained and that air once in the system remains cool. For example, the intake opening 42 is almost concealed in the forward portion of the hood in a relatively cool zone and at a point remote from the manifold so that it is possible to take advantage of the desirable inertia effect of a column of air moving in a long tube. In addition the air cleaner 24 is located forwardly of the insulating barrier formed by the fan 19 so that for the time interval that air must be confined in the system, a substantial portion of that interval occurs in the part of the system forward of the barrier formed by the fan.

It has been found that the dirt content in air increases rearwardly of the front tractor wheel 47 and although the air intake opening 42 is located in a relatively clean zone, chaff, insects and other foreign particles may be entrained in the air. These materials are filtered from the air by the screen 46 and smaller particles of dust are filtered by the oil and filtering elements of the air cleaner unit 24. The combustion air passing through the intake system to the manifold 8 is consequently not only cool but relatively clean.

As chaff and other foreign substances accumulate on the screen 46, it is necessary to remove the material to permit the free flow of air. This is readily accomplished by opening the access panel 13 of the hood 11 to the position shown in Fig. 2 so that the screen 46 is exposed and the accumulated material may be brushed away or the screen may be removed and thoroughly cleaned.

It will be apparent that there has been provided an air intake system for internal combustion engines in which air is taken from a relatively clean, cool location remote from the intake manifold and is conveyed to the engine in a long conduit to take advantage of the inertia effect of air moving in a long column, and in which air in the system is conveyed through the hot engine areas for a minimum length of time to avoid heating. Furthermore, it will be apparent that a portion of the intake system is formed by the engine hood in a manner which detracts from neither the field of vision of an operator nor the appearance of the tractor, and which affords ready access for cleaning and servicing of a screen in the intake system.

It should be understood that it is not intended to limit the invention to the above described forms and details, and that the invention includes such other forms and modifications as are embraced by the scope of the appended claims.

I claim as my invention:

1. In combination with an internal combustion engine having a radiator behind which a cooling fan is disposed for drawing air through the radiator, a grille structure positioned forwardly of the radiator, a hood extended rearwardly from said grille structure so as to enclose said engine and radiator, said hood being in snug engagement with the sides of said radiator, said hood having an upper swingably mounted panel providing access to said engine, a generally horizontal plate fitted between and being in snug abutting relation with the top of said grille structure, the sides of said hood and said radiator adjacent its top so as to prevent air flow through said grille structure and over the top of said radiator, an air cleaner mounted in said plate and extending down into the path of air drawn through said grille structure and radiator, said cleaner having an upwardly extended air intake passage abutting said swingable panel when the latter is closed, and said panel having an opening defining an air intake duct extending through the panel, said duct being in closed communication only with said passage when the panel is closed.

2. In combination with an internal combustion engine having a radiator behind which a cooling fan is disposed for drawing air through the radiator, a grille structure positioned forwardly of the radiator, a hood extended rearwardly from said grille structure so as to enclose said engine and radiator, said hood being in snug engagement with the sides of said radiator, said hood having an upper swingably mounted panel providing access to said engine, means within said hood for preventing air flow through said grille structure and over the top of said radiator, an air cleaner mounted in front of said radiator and extending down into the path of air drawn through said grille structure and radiator, said cleaner having an upwardly extended air intake passage extending through said means and abutting said swingable panel when the latter is closed, and said panel having an opening defining an air intake duct extending through the panel, said duct being in closed communication only with said passage when the panel is closed, and a screen element disposed across the top of said passage so as to be accessible for cleaning when the panel is opened.

References Cited in the file of this patent

UNITED STATES PATENTS

| | | |
|---|---|---|
| 1,846,283 | Summers | Feb. 23, 1932 |
| 1,855,038 | Walker | Apr. 19, 1932 |
| 1,957,919 | Tice | May 8, 1934 |
| 2,197,503 | Martin | Apr. 16, 1940 |
| 2,203,407 | Donaldson | June 4, 1940 |
| 2,224,740 | Melcher | Dec. 10, 1940 |
| 2,670,055 | Dorman et al. | Feb. 23, 1954 |
| 2,701,024 | Thomas | Feb. 1, 1955 |
| 2,705,540 | Zierer | Apr. 5, 1955 |
| 2,708,920 | Pasturczak | May 24, 1955 |

FOREIGN PATENTS

| | | |
|---|---|---|
| 178,553 | Austria | May 25, 1954 |

OTHER REFERENCES

Publication "Mechanical Topics," vol. 15, No. 1, publ. October 1953 by The International Nickel Co.; page 2, "Ford's Futuristic X-100."

Publication "Motor," October 1953, page 26; "Packard's New Program."